US009348567B2

(12) United States Patent
Sharma et al.

(10) Patent No.: US 9,348,567 B2
(45) Date of Patent: May 24, 2016

(54) PROFILE GUIDED OPTIMIZATION IN THE PRESENCE OF STALE PROFILE DATA

(71) Applicant: Microsoft Corporation, Redmond, WA (US)

(72) Inventors: Shishir Sharma, Redmond, WA (US); Ankit Asthana, Redmond, WA (US); Terry Jack Mahaffey, Redmond, WA (US); Ten H. Tzen, Sammamish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

(21) Appl. No.: 14/323,663

(22) Filed: Jul. 3, 2014

(65) Prior Publication Data

US 2016/0004518 A1    Jan. 7, 2016

(51) Int. Cl.
*G06F 9/45* (2006.01)

(52) U.S. Cl.
CPC .................................. *G06F 8/443* (2013.01)

(58) Field of Classification Search
CPC ........................................................ G06F 8/443
USPC ................................................. 717/151–161
See application file for complete search history.

(56) References Cited

U.S. PATENT DOCUMENTS

| 6,631,518 | B1* | 10/2003 | Bortnikov et al. ............ 717/158 |
| 8,359,587 | B2 | 1/2013 | Song et al. |
| 8,543,907 | B1 | 9/2013 | Roskind |
| 2003/0066060 | A1* | 4/2003 | Ford .............................. 717/158 |
| 2004/0194077 | A1* | 9/2004 | Bharadwaj et al. ........... 717/158 |
| 2011/0016460 | A1 | 1/2011 | Archambault et al. |
| 2013/0067441 | A1 | 3/2013 | Lafreniere et al. |
| 2014/0013312 | A1* | 1/2014 | Cho et al. ...................... 717/129 |
| 2014/0047423 | A1 | 2/2014 | Pizlo et al. |
| 2014/0281434 | A1* | 9/2014 | Madriles et al. .............. 712/227 |
| 2015/0347103 | A1* | 12/2015 | Mahaffey .............. G06F 8/4441 717/153 |

OTHER PUBLICATIONS

"POGO," <http://blogs.msdn.com/b/vcblog/archive/2008/11/12/pogo.aspx>, Nov. 12, 2008, p. 1-6.*
Asthana, Ankit, "Profile Guided Optimization (POGO)," Mar. 20, 2013, p. 1-35.*
Gatlin, Kang Su, "Profile-Guided Optimization with Microsoft Visual C++ 2005", Published on: Mar. 2004, Available at: http://msdn.microsoft.com/en-us/library/aa289170(v=vs.71).aspx.
Asthana, Ankit, "Profile Guided Optimization (PGO)—Under the Hood", Published on: May 27, 2013, Available at: http://blogs.msdn.com/b/vcblog/archive/2013/05/28/profile-guided-optimization-pgo-under-the-hood.aspx

(Continued)

*Primary Examiner* — Qing Chen
(74) *Attorney, Agent, or Firm* — Kevin Sullivan; Kate Drakos; Micky Minhas (57) ABSTRACT

Profile guided optimization (PGO) in the presence of stale profile data as described herein can be based on path profiling, whereby different paths through a program's call graph are uniquely identified. Stale profile data is data collected in a training run of a previous version of the program. Profile data can be collected along these paths and optimization decisions can be made using the collected data. The paths can be numbered using an algorithm that assigns path increments to all the callees of a function. The path increment assignments (which can be stored in the profile database) can be used to locate the profile data for that path and to make corresponding optimization decisions. PGO optimizations along call graph paths involving edited functions can be performed.

20 Claims, 5 Drawing Sheets

(56) References Cited

OTHER PUBLICATIONS

Gatlin, Kang Su, "Tips and Tricks: Visual C++ 2005 Optimization Best Practices", Published on: Feb. 16, 2006, Available at: blog.blanar.net/files/TLNL04_Gatlin.ppt.

Asthana, Ankit, "Build faster and high performing native applications using PGO", Published on: Apr. 4, 2013, Available at: http://blogs.msdn.com/b/vcblog/archive/2013/04/04/how-to-build-faster-and-high-performing-native-applications-using-pgo.aspx.

Chen, et al., "Taming Hardware Event Samples for Precise and Versatile Feedback Directed", In Proceedings of IEEE Transactions on Computers, vol. 62, Issue 2, Feb. 2013, 15 pages.

"Profile Guided Optimization in the Performance and Diagnostics Hub", Retrieved on: Jun. 5, 2014, Available at: http://msdn.microsoft.com/en-us/library/dn457343.aspx.

"Profile-Guided Optimizations Overview", Retrieved on: Jun. 5, 2014, Available at: https://software.intel.com/sites/products/documentation/doclib/stdxe/2013/composerxe/compiler/fortran-win/GUID-42C5C93F-5F77-4B14-8A27-95798BC30CE3.htm.

"Improve Application Performance and Developer Productivity using the latest IBM XL C/C++ compilers for IBM Power System", Retrieved on: Jun. 5, 2014, Available at: http://www-01.ibm.com/support/docview.wss?uid=swg27027518&aid=1.

U.S. Appl. No. 14/292,347, filed May 30, 2014, Joseph, et al., "Multiphased Profile Guided Optimization".

* cited by examiner

PROFILE GUIDED OPTIMIZATION IN THE PRESENCE OF STALE PROFILE DATA

BACKGROUND

Profiling is a type of dynamic program analysis that measures, for example, the memory used by a program, how many times a particular function is called and so on. Profile-guided optimization is a compiler optimization technique in which profiling is used to attempt to improve program runtime performance. In contrast to traditional compiler optimization techniques that only use the source code to make optimizations, profile-guided optimization uses the results of profiling test runs of instrumented programs to optimize the final generated code. As one example, a "hotspot", a section of code that is executed frequently, can be identified by counting how many times the section of code is executed, and that code can be made more efficient.

SUMMARY

Profile guided compiler optimization decisions are performed in the presence of source code changes. Optimization decisions including but not limited to inlining, speed versus size compilation, code layout and the like can be performed for edited functions. Inlining or inline expansion refers to replacing a function call with the body of the function that is being called. Inlining typically but not always improves time and space usage at runtime. Inlining typically but not always increases the final size of the program (i.e., the size of the executable). Inlining can be done automatically by the compiler. In some cases inlining can be manually specified via compiler directives. The compiler can use a variety of mechanisms to decide which function calls should be inlined, including but not limited to programmer input for particular functions, and/or control via command-line options.

Profile guided optimization (PGO) can use optimization decisions associated with a previous version of a program to make optimization decisions for a current (modified) version of the program. This type of profile data is called "stale". That is, "stale" profile data is data collected in a training run of a previous version of the program. Profile guided optimization in the presence of stale profile data as described herein can be based on path profiling, whereby different paths through a program's call graph are uniquely identified. Profile data can be collected along these paths for a first version of a program and optimization decisions can be made using the collected data for a second version of the program. The paths can be numbered using an algorithm that assigns path increments to all the callees of a function. Path identifiers can be computed from the path increments. The path identifiers (which can be stored in the profile database) can be used to locate the profile data for that path and to make corresponding optimization decisions. PGO optimizations along call graph paths involving edited functions can be performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

In known forms of profile guided compiler optimization, source code is provided to a compiler and is compiled into a training executable. Training data is provided to the training executable and profile statistics are collected when the training executable is run. Profile guided optimization (PGO) is a compiler optimization technique in which optimization decisions for a particular portion of source code are guided by profile data that has been collected for that source code. The PGO lifecycle includes instrumentation, training and optimization phases. In the instrumentation phase, the source code is compiled with instrumentation so that profile information can be collected. In the training phase, profile information is collected by executing the instrumented executable with reference input (training datasets) and storing the profile data in a file (e.g., the profile database). In the optimization phase, the un-instrumented source code is recompiled, using the instrumentation data stored in the profile database to guide compiler optimizations. That is, profile statistics are used to optimize the results of a second profile guided compilation for the program.

Typically in PGO the source code used for the instrumentation and the optimization phases are identical except for the instrumentation. If the source code is modified after profile data has been collected, the profile data is referred to as being "stale". This means that to successfully use PGO, with every source code change, the profile data becomes stale and traditionally, the three steps have to be repeated. This state of affairs quickly becomes a scalability bottleneck for large code bases with frequent code changes. To overcome this limitation some PGO solutions allow source code changes between the instrumentation and the optimization phases. However, doing so may ignore completely profile data involving modified functions or may incorrectly match profile data to modified functions leading to poor optimization decisions.

Thus, in order to use PGO technology effectively, the frequency with which instrumentation, training and optimization of the code base occurs may have to increase, placing a burden on the engineering systems and thereby potentially decreasing PGO adoption. The subject matter described herein is intended to improve PGO results in the presence of stale profile data and thereby decrease the cost of owning PGO technology and thus promoting its adoption.

Improving Profile Guided Optimizations in the Presence of Stale Profile Data

Figure 1A:
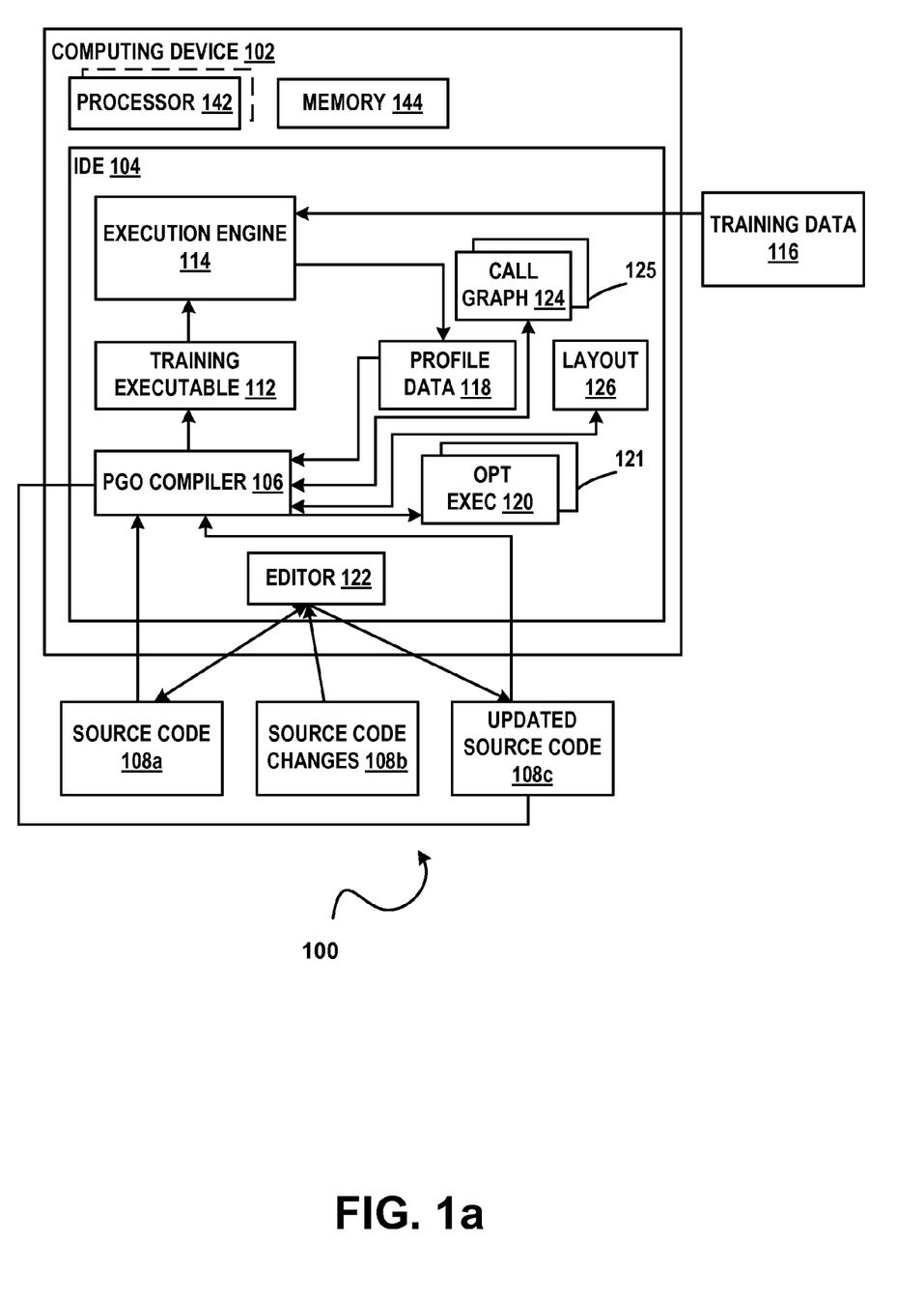
FIG. 1a illustrates an example of a system 100 comprising an optimizing compiler in accordance with aspects of the subject matter described herein.

FIG. 1a illustrates an example of a system 100 comprising an optimizing compiler in accordance with aspects of the subject matter described herein. All or portions of system 100 may reside on one or more computers or computing devices such as the computers described below with respect to FIG. 3. System 100 may execute on a software development computer such as the software development computer described with respect to FIG. 4. System 100 or portions thereof may execute within an integrated development environment or IDE such as IDE 104 or may execute outside of an IDE. The IDE can be an IDE such as the one described with respect to FIG. 4 or can be any other IDE. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, and so on. A computing device such as computing device 102 can include one or more processors such as processor 142, etc., and a memory such as memory 144 that communicates with the one or more processors.

System 100 may include one or more of: a compiler and/or one or more of: an execution engine. The compiler can be a background compiler, a parallel compiler or an incremental compiler, a plug-in, an add-in or extension to an IDE, parser, compiler or pre-processor. The compiler can compile source code such as source code 108a written in any programming language into native code, intermediate code or managed code. The compiler can be a profile guided optimization (PGO) compiler. The compiler can generate a training executable that is instrumented with instructions that collect profile data. For example, a training executable can be instrumented to collect information such as how many times a particular function, multiple functions or all functions are called, how many times a particular block or multiple blocks of code are accessed, how many times a particular feature or features is/are invoked and so on. Counts can be path specific. For example, suppose function A calls function Foo and function B calls function Foo. A separate set of counts can be collected for the function A calling function Foo path and for the function B calling function Foo path. For every switch statement, a histogram of counts of values can be generated. For every indirect call, a histogram of call targets can be generated. For every division operation, a histogram of the divisors can be generated.

The compiler can be a compiler such as PGO compiler 106 that is a PGO compiler that performs PGO optimizations along call graph paths that may include edited functions in accordance with aspects of the subject matter described herein. PGO compiler 106 may use decisions based on a previous version of a program for a current (modified) version of the program. PGO compiler 106 may use stale profile data, profile data collected in a training run of a previous version of the program, in accordance with aspects of the subject matter described herein. The PGO performed by PGO compiler 106 can be based on path profiling. In path profiling, different paths through a program's call graph (e.g., call graph 124) can be uniquely identified. Profile data can be collected along the uniquely identified paths. Optimization decisions can be made along the paths using the collected data. The paths can be numbered using an algorithm that assigns path increments to all the callees of a function. The path increments can be stored in the profile database. The path increments can be used to compute a path identifier that is used to locate the profile data for that path. The profile data for the path can be used to make optimization decisions for the path. In known PGO systems, profile data is read only for functions which have not been edited while profile data for edited functions is ignored, or profile data is incorrectly matched in the presence of source code edits. Thus in known systems, PGO optimizations are often disabled for any path that involves edited functions. In contrast, in accordance with aspects of the subject matter described herein, PGO optimizations can be performed along call graph paths involving edited functions.

An execution engine such as execution engine 114 can receive a training dataset such as, for example, training data 116. Execution engine 114 can generate profile data such as profile data 118 during execution of a training executable such as training executable 112. Profile data 118 can be used to generate an optimized executable such as optimized executable 120. Subsequently, potentially using an editor such as editor 122, source code changes such as source code changes 108b can be made to source code 108a to generate modified source code such as updated source code 108c. When updated source code 108c is compiled, profile data 118 can be used along with call graph 124 generated from compilation of the original source code, source code 108a, and call graph 125 generated from compilation of the modified source code, updated source code 108c, to generate an optimized executable such as optimized executable 121 for updated source code 108c. Alternatively, when updated source code 108c is compiled, profile data 118 can be used along with call graph 124 generated from compilation of the original source code, source code 108a to generate an optimized executable such as optimized executable 121 for updated source code 108c. Alternatively, call graph 124 may be updated as a result of the compilation of updated source code 108c.

Figure 1B:
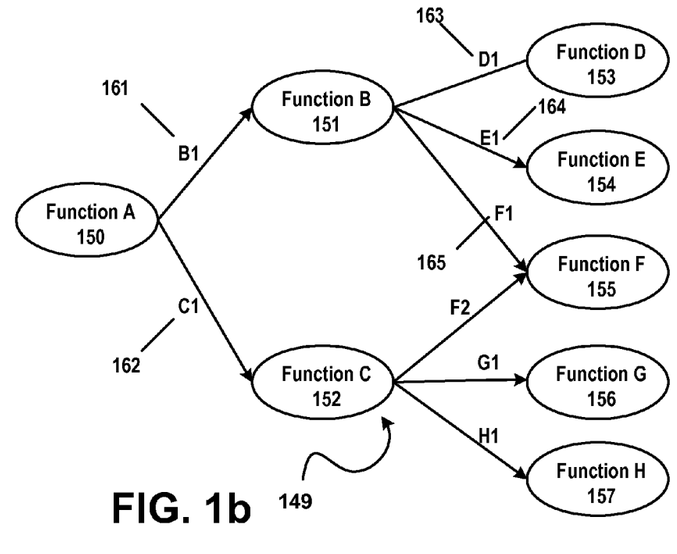
FIG. 1b illustrates a call graph in accordance with aspects of the subject matter described herein.

FIG. 1b illustrates as example of a call graph in accordance with aspects of the subject matter described herein. Suppose that in source code 108a, function A 150 can call function B 151 and function A 150 can call function C 152. Suppose further that function B 151 can call function D 153, function E 154 and function F 155. Suppose function C 152 can call function F 155, function G 156 and function H 157. A call graph such as call graph 149 of FIG. 1b can be created. Each path through the call graph can be labeled or identified by a unique path identifier. For example, a path could be labeled by a name such as the callee function name and a sequential number. For example, the path from function A 150 to function B 151 can be assigned the label "B1" 161 as illustrated in FIG. 1b. The path from function A 150 to function C 152 can be assigned the label "C1" 162, the path from function B 151 to function D 153 can be assigned the label "D1" 163, the path from function B 151 to function E 154 can be assigned the label "E1" 164, the path from function B 151 to function F 155 can be assigned the label "F1" 165 and so on. Similarly, the path from function A 150 to function B 151 to function D 153 can be assigned some other unique identifier. For example, the path from function A 150 to function B 151 to function D 153 can be assigned the label "D1B1".

It will be appreciated that alternative labeling algorithms can be devised. Each path within the call graph can be assigned monotonically increasing sequence numbers. For example, each path through the call graph can be labeled by a unique number. For example, the path from function A 150 to function B 151 (and only that path) can be assigned the label "1", the path from function A 150 to function C 152 (and only that path) can be assigned the label "2", the path from function B 151 to function D 153 (and only that path) can be assigned the label "3" and the path from function B 151 to function E 154 (and only that path) can be assigned the label "4" and so on. Similarly, the path from function A 150 to function B 151 to function D 153 can be assigned the label "9", the path from function A 150 to function B 151 to function E 154 can be assigned the label "10" and so on. Alternatively, the path from function A 150 to function B 151 to function D 153 could be the sum of the number assigned to the path from function A 150 to function B 151 (e.g., 1) and the number assigned to the path from function B 151 to function D (e.g., 3) so that, for example, the unique identifier for the path from function A 150 to function B 151 to function D 153 is "4". The path identifier for the path from function A 150 to function B 151 to function D 153 can be computed from the sum of the path increments. For example, the path identifier for the path from function A 150 to function B 151 to function D 153 could be "D4".

Figure 1C:
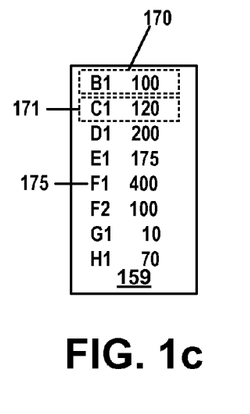
FIG. 1c illustrates an example of profile data in accordance with aspects of the subject matter described herein.

Profile data for a first version of a program can be collected and stored, e.g., in profile data 118. Path increments can be assigned and path identifiers can be computed. The call graph path identifiers can be used as a key into the profile data, as illustrated in FIG. 1c, table 159. For example, the first row 170 in the table 159 indicates that the path identified by "B1" (function A 150 calls function B 151) was executed 100 times, row two 171 indicates that the path identified by "C1" was executed 120 times and so on. The profiling data of table 159 can be used to generate optimized executable 120.

Figure 1D:
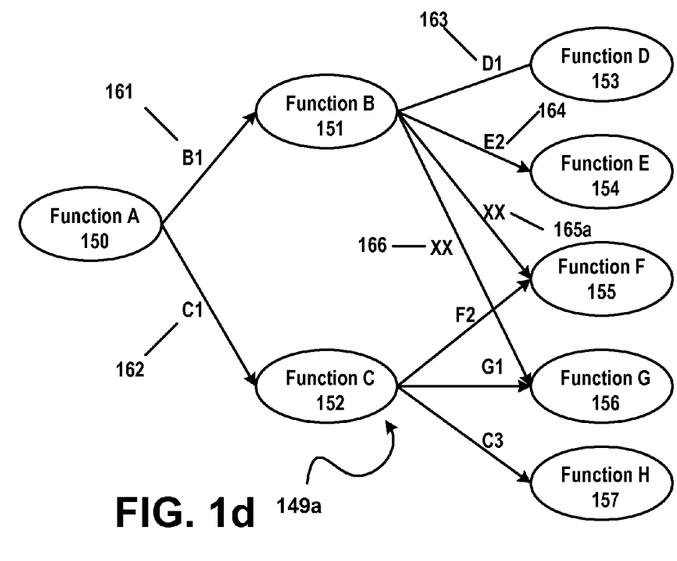
FIG. 1d illustrates a call graph in accordance with aspects of the subject matter described herein.

Now suppose that source code changes 108b are applied to source code 108a using editor 122 to create updated source code 108c. At this point, some of the stored profile data in profile data 118 is likely to be inaccurate. For example, suppose that in the source code changes 108b, function B 151 is changed so that function B 151 no longer can call function F 155. Instead of discarding profile data for all paths involving function B 151 because function B 151 changed, in accordance with aspects of the subject matter described herein, only the affected portion of the profiling data is not used. As illustrated in FIG. 1c row 5 175, in the previous version of the source code in which function B 151 can call function F 155, function F 155 was called by function B 151 400 times. In the updated version of the source code, function B 151 cannot call function F 155. In accordance with aspects of the subject matter described herein, the path from function B 151 can be relabeled to a value that will not be found in the profile data. In FIG. 1d call graph 149a, this is signified by relabeling the path from function B 151 to function F 155 to the value "XX" 165a. Value "XX" is not in table 159. Hence the profile data for the path from function B 151 to Function F 155 is functionally removed. That is, because there is no entry in the profile data for the callee (function F 155) for the path identifier ("XX" 165a) for the edited function (function B 151), no profile data is available.

Figure 1E:
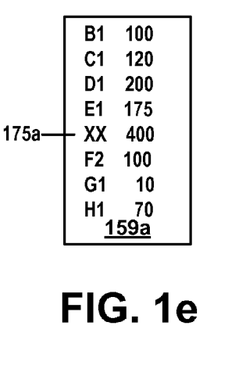
FIG. 1e illustrates another example of profile data in accordance with aspects of the subject matter described herein.

However, profile data for the path in which function B 151 calls function D 153 and profile data for the path in which function B 151 calls function E 154 can still be used. Similarly, suppose in the update source code 108c, function B 151 is changed so that function B 151 can call function G 156. By comparing the call graph for the original version of the source code with the new call graph, the call graph for the updated source code, it can be determined that in the original version of function B 151, function B 151 could not call function G 156 and so therefore the path from function B 151 to function G 156 can be given an invalid path identifier (e.g., "XX" 166 in FIG. 1d). In accordance with other aspects of the subject matter described herein, only callees with the same name and number as those found in the profile database are assigned valid path increments, all others are assigned invalid path increments from which invalid path identifiers (path identifiers that cannot be found in the profile data) are computed. For example, an invalid path increment can be "−1". Alternatively, instead of changing the path label, the profile data table can be changed to render the key invalid, as illustrated in FIG. 1e, table 159a row 175a, signifying that the profile data for the path labeled "XX" is invalid.

Thus, for edited source code 108c, training data 118 generated from a previous version of a program (source code 108a) using call graph 125 and/or call graph 124 can be used to optimize an executable by inlining an edited version of the program (e.g., source code 108c is the edited version of the program). A decision to compile a function for speed or for size can be based on the dynamic instruction count of the function. In accordance with aspects of the subject matter described herein, the decision to optimize based or size or based on speed can include functions with stale profile data. That is, the decision to optimize based on speed or to optimize based on size can be made for an edited function as would have been made had the function not been edited.

Path specific function counts can be used to make path particular decisions concerning inlining, code layout, and so on. For example, path specific function counts can be used to decide whether a particular function will be inlined. Similarly, path specific function counts can be used to decide whether function 1 is placed close to function 2 and so on. If function 1 calls function 2 many times it may be advantageous to place function 2 close to function 1. Doing so can improve application performance by exploiting temporal locality for optimizing cache reuse. If function 1 rarely calls function 2, it may not be advantageous to place function 2 close to function 1. Similarly, path specific function counts can be used to make speed/size decisions. For example, inlining function 2 may be advantageous even if doing so will increase the size of the executable, because the increase in the size of the executable is outweighed by the number of times function 2 is called by function 1.

After decisions concerning inlining, code layout and speed/size considerations are made, the path specific counts can be used to make additional optimization decisions such as but not limited to loop unrolling, dead/cold code separation and so on. Loop unrolling refers to a technique that attempts to optimize execution speed at the expense of increasing its size by reducing or eliminating instructions that control the loop. Loop controlling instructions include but are not limited to pointer arithmetic and "end of loop" tests on each iteration, reducing branch penalties and reducing delays in reading data from memory by rewriting loops as a repeated sequence of independent statements.

Dead code separation refers to moving code that is not used or that is redundant to a more remote location. In accordance with aspects of the subject matter described herein, a layout graph (e.g., layout graph 126 of FIG. 1a) can be constructed to model caller-callee interactions. The layout graph can be built using profile information stored in the profile data. The layout graph in accordance with aspects of the subject matter can be created by a PGO compiler. The layout graph can comprise instrumented functions, a subset of the total number of functions in the program. Non-PGO (un-instrumented) functions can include small linear flow functions, or certain (usually system) functions known to be problematic if instrumented. The layout graph can be modified as inline decisions and layout decisions are made. The nodes of the layout graph can be functions. The edges of the layout graph can represent the number of function calls. The layout graph can be used to determine function layout order such that functions along hot paths (sections of code that are executed frequently) are laid out together. The profile data stored in the profile database can represent pre-inlining information. Hence, the layout graph can be updated with each inline decision made.

Figure 2:
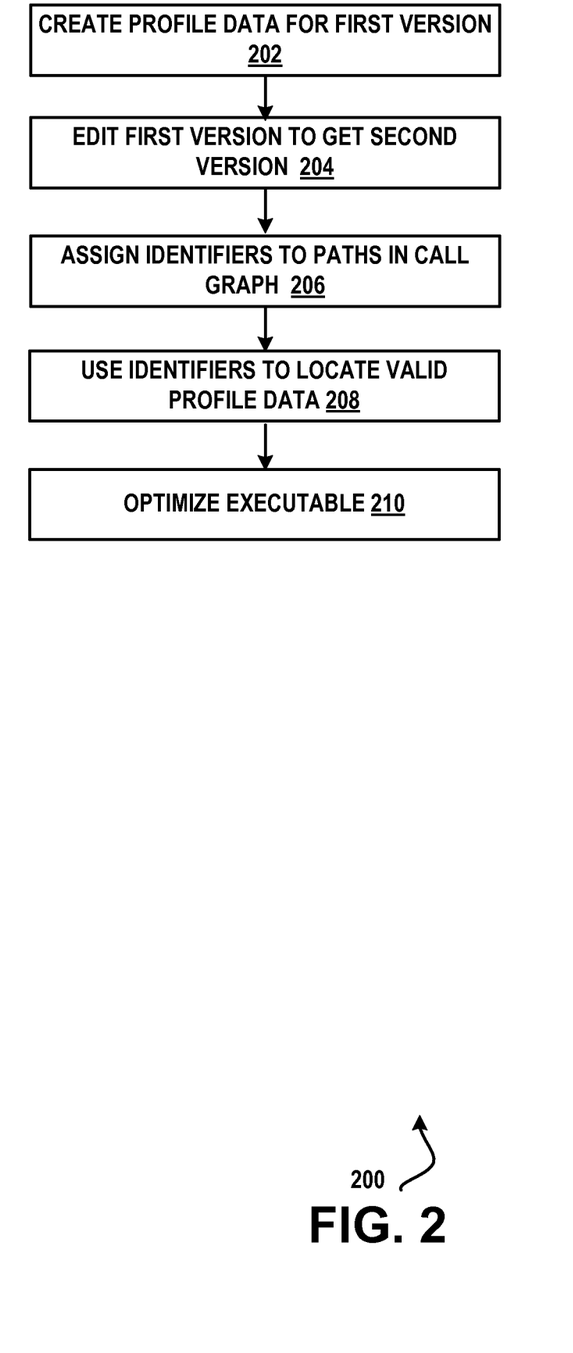
FIG. 2 illustrates an example of a method 200 comprising a method of performing profile guided compiler optimization in accordance with aspects of the subject matter disclosed herein.

FIG. 2 illustrates an example of a method 200 for performing profile guided compiler optimization using stale profile data in accordance with aspects of the subject matter described herein. The method described in FIG. 2 can be practiced by a system such as but not limited to the one described with respect to FIG. 1a. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

As described more fully above, at operation 202 profile data for a first version of a program can be created. At operation 204, the program can be edited to create a second version of the program, rendering the profile data produced at operation 202 stale. At operation 206 path increments can be assigned to the callees of the modified functions in the second version of the program. Only callees with the same name and number as those found in the profile database are assigned valid path increments. Callees for which the same name and number is not found in the profile database is assigned an invalid path increment. At operation 208 valid path identifiers can be used to locate valid profile data. At operation 210 an executable for the second version of the program can be optimized using profile data created from the first version of the program. The second version of the program can be optimized by one or more of: inlining, optimization for speed/size, and/or optimization of layout of functions within the executable.

A system can comprise at least one processor, a memory connected thereto and one or more program modules of a profile guided optimizing compiler. The compiler can receive profiling data for a first version of a program (original source code) and can use the profiling data associated with the first version of a program to generate an optimized executable for a second version of the program (modified source code). The system can include one or more program modules that assign a path increment to each callee of a function in the second version of the program, where the function in the second version of the program is a function that has been modified from that function in the first version of the program. The system can include one or more program modules that assign an identifier to each path in a call graph for the second version of the program. The system can include one or more program modules that uses path identifiers assigned to a callee of a function of the second version of the program to locate valid profiling data associated with the first version of the program. The system can include one or more program modules that make one or more optimization decisions for the second version of the program based on profiling data associated with the first version of the program. The optimization decision can be a decision to inline function code. The optimization decision can be a speed/size decision or a function layout decision.

A method executed by a processor of a computing device can comprise any combination of operations including: assigning path identifiers to paths of a call graph representing function calls in an edited program comprising a second version of a program, using profile data for a first version of the edited program to optimize the second version of the program using profile data created from the first version of the program, optimizing the program by inlining function code, making a speed or size decision, making a layout decision for functions of an executable, assigning an invalid identifier to a path for which valid profile data is not available and/or assigning path increments to all the callees of a function of the second version of the program, the function comprising a function that has been modified from the first version of the program.

A computer-readable storage medium can include computer-readable instructions which when executed cause a processor of a computing device to use valid profile data collected from training a first version of a program to optimize an edited program comprising a second version of the program by generating a call graph of functions of the second version of the program in which each callee of a modified function in the call graph of the second version of the program for which profile data is available, is assigned a path increment from which a valid path identifier can be computed; and use valid profiling data generated from the first version of the program located by the valid path identifier. The storage medium can include other instructions that assign an invalid path increment from which an invalid path identifier is computed to a path for which no valid profiling data is available.

The storage medium can include other instructions that optimize an executable of the second version of the program by inlining function code. The storage medium can include other instructions that optimize an executable of the second version of the program by making a speed/size decision. The storage medium can include other instructions that optimize an executable of the second version of the program by making a function layout decision. The storage medium can include other instructions that assign an invalid identifier to a path for which valid profile data is not available. The storage medium can include other instructions that perform optimizations along call graph paths involving edited functions.

Example of a Suitable Computing Environment

Figure 3:
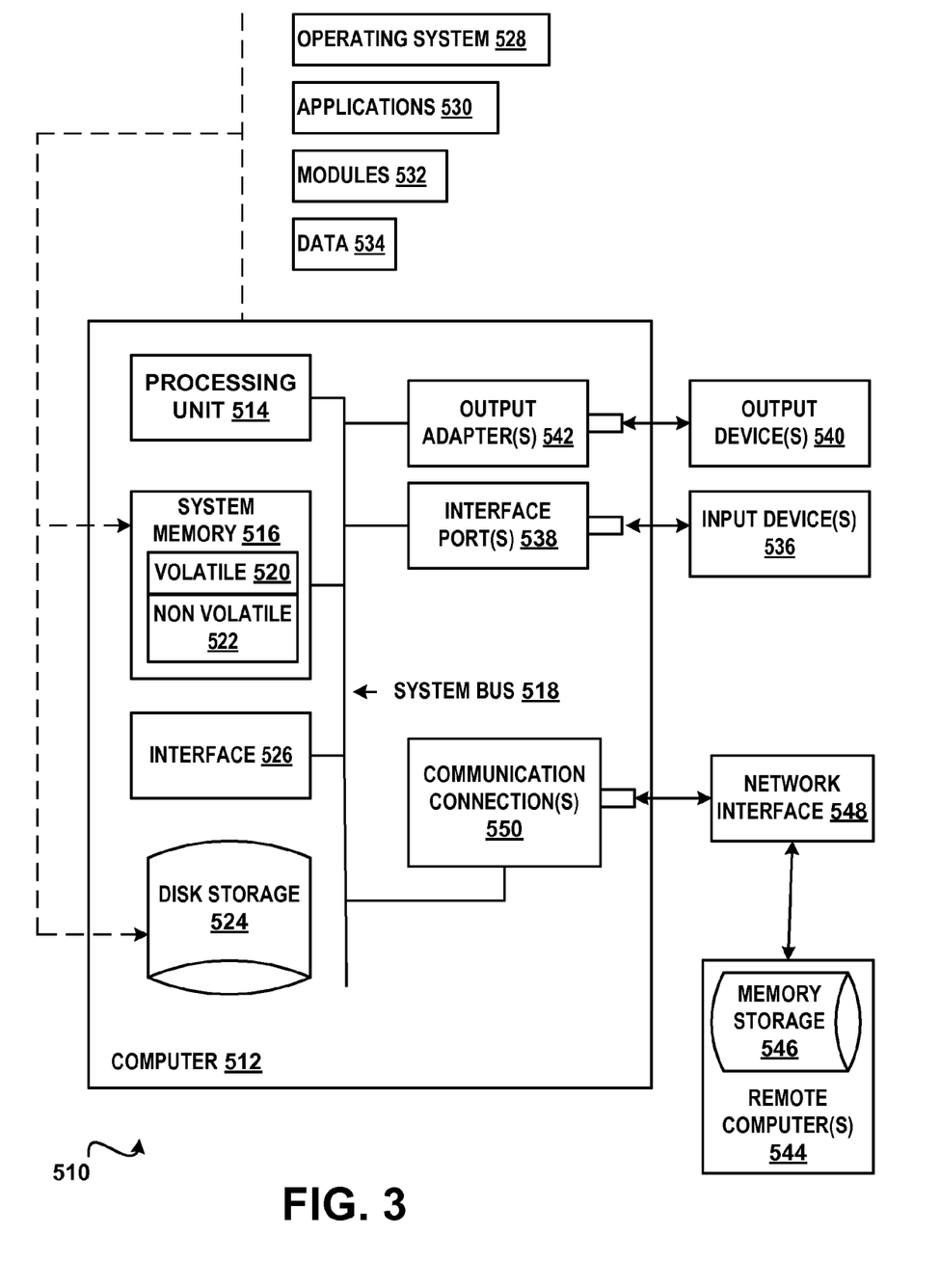
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Figure 4:
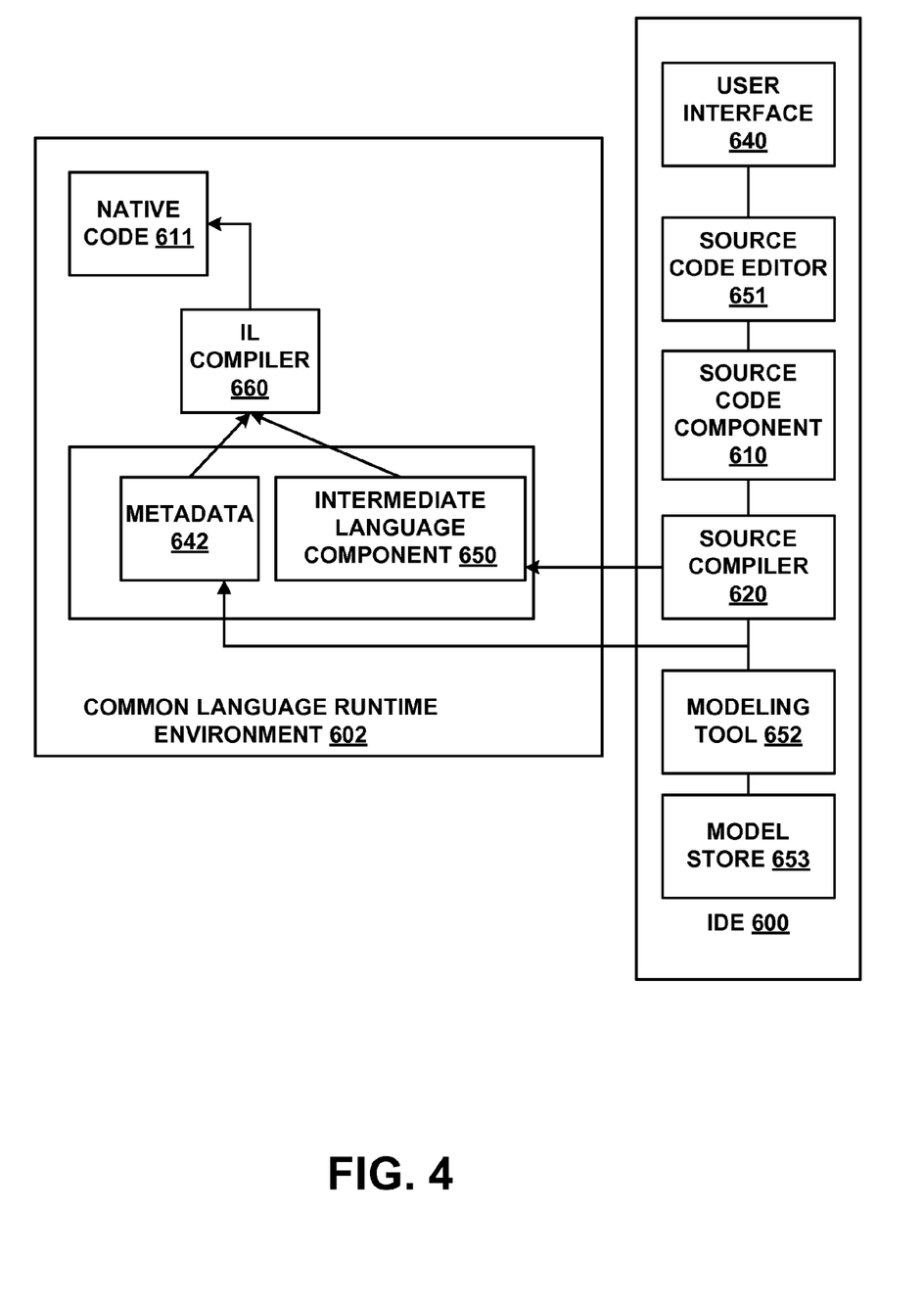
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++, C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
  at least one processor;
  a memory connected to the at least one processor; and
  at least one program module comprising a profile guided optimizing compiler that:
    receives profiling data associated with a first version of a program;
    identifies portions of the profiling data associated with the first version of the program affected by changes made to the first version of the program that are included in a second version of the program; and
    uses portions of the profiling data associated with the first version of the program not affected by changes made to the first version of the program that are included in the second version of the program, to generate an optimized executable for the second version of the program.

2. The system of claim 1, further comprising at least one program module that assigns a path increment to each callee of a function of the second version of the program, the function of the second version of the program comprising a function that has been modified from the first version of the program.

3. The system of claim 1, further comprising at least one program module that assigns an identifier to each path in a call graph for the second version of the program.

4. The system of claim 1, further comprising at least one program module that uses path identifiers assigned to a callee of a function of the second version of the program to locate valid profiling data associated with the first version of the program.

5. The system of claim 1, further comprising at least one program module that makes an optimization decision for the second version of the program based on profiling data associated with the first version of the program.

6. The system of claim 5, the optimization decision comprising a decision to inline function code.

7. The system of claim 5, the optimization decision comprising a speed/size decision or a function layout decision.

8. A method comprising:
  assigning, by a processor of a computing device, path identifiers to paths of a call graph representing function calls in an edited program comprising a second version of a program;
  identifying portions of profile data associated with a first version of the edited program affected by changes made to the first version of the edited program that are included in the second version of the program;
  determining which path identifiers are associated with valid profile data, the valid profile data associated with the profile data of the first version of the edited program not affected by changes made to the first version of the edited program that are included in the second version of the program; and
  using the valid profile data to optimize the second version of the program.

9. The method of claim 8, further comprising:
optimizing the program by inlining function code.

10. The method of claim 8, further comprising:
optimizing the program by making a speed or size decision.

11. The method of claim 8, further comprising:
optimizing the program by making a layout decision for functions of an executable.

12. The method of claim 8, further comprising:
assigning an invalid identifier to a path for which valid profile data is not available.

13. The method of claim 8, further comprising:
assigning path increments to all callees of a function of the second version of the program, the function of the second version of the program comprising a function that has been modified from the first version of the edited program.

14. A device, comprising:
at least one processor and a memory;
the at least one processor configured to:
    use valid profile data collected from training a first version of a program to optimize an edited program comprising a second version of the program by:
        identifying portions of profile data of the first version of the program affected by changes made to the first version of the program that are included in the second version of the program;
        generating a call graph of functions of the second version of the program in which each callee of a modified function in the call graph of the functions of the second version of the program for which profile data is available is assigned a path increment from which a valid path identifier is computed, the valid profile data associated with profile data of the first version of the program not affected by changes made to the first version of the program that are included in the second version of the program; and
        locating valid profile data generated from the first version of the program using the valid path identifier.

15. The device of claim 14, wherein the at least one processor is further configured to:
    assign an invalid path increment to a path for which no valid profile data is available.

16. The device of claim 14, wherein the at least one processor is further configured to:
    optimize an executable of the second version of the program by inlining function code.

17. The device of claim 14, wherein the at least one processor is further configured to:
    optimize an executable of the second version of the program by making a speed/size decision.

18. The device of claim 14, wherein the at least one processor is further configured to:
    optimize an executable of the second version of the program by making a function layout decision.

19. The device of claim 14, wherein the at least one processor is further configured to:
    assign an invalid identifier from which an invalid path identifier is computed to a path for which the valid profile data is not available.

20. The device of claim 14, wherein the at least one processor is further configured to:
    perform optimizations along call graph paths involving edited functions.

* * * * *